United States Patent
Wang et al.

(10) Patent No.: US 9,569,699 B2
(45) Date of Patent: Feb. 14, 2017

(54) SYSTEM AND METHOD FOR SYNTHESIZING PORTRAIT SKETCH FROM A PHOTO

(75) Inventors: Xiaogang Wang, Hong Kong (CN); Xiaoou Tang, Hong Kong (CN); Wei Zhang, Hong Kong (CN)

(73) Assignee: Shenzhen SenseTime Technology Co., Ltd., Shenzhen (CN)

( * ) Notice: Subject to any disclaimer, the term of this patent is extended or adjusted under 35 U.S.C. 154(b) by 879 days.

(21) Appl. No.: 13/820,729

(22) PCT Filed: Sep. 3, 2010

(86) PCT No.: PCT/CN2010/076605
§ 371 (c)(1),
(2), (4) Date: Aug. 9, 2013

(87) PCT Pub. No.: WO2012/027904
PCT Pub. Date: Mar. 8, 2012

(65) Prior Publication Data
US 2013/0308853 A1   Nov. 21, 2013

(51) Int. Cl.
*G06K 9/00* (2006.01)
*G06K 9/66* (2006.01)
*G06T 11/60* (2006.01)

(52) U.S. Cl.
CPC .............. *G06K 9/66* (2013.01); *G06T 11/60* (2013.01); *G06T 2210/22* (2013.01)

(58) Field of Classification Search
None
See application file for complete search history.

(56) References Cited

U.S. PATENT DOCUMENTS

2004/0228504 A1* 11/2004 Chang ............... G06K 9/00288
                                                           382/118
2007/0223827 A1*  9/2007 Nishimori ............. G06T 11/00
                                                           382/249

FOREIGN PATENT DOCUMENTS

CN           101017657         8/2007
CN           101551911        10/2009

OTHER PUBLICATIONS

Wang et al. "Face Photo-Sketch Synthesis and Recognition", published online Sep. 4, 2008, IEEE Transactions on Pattern Analysis and Machine Intelligence, vol. 31, No. 11, 1955-1967.*
Klare et al. "Sketch-to-photo matching: a feature-based approach", Apr. 14, 2010, Proc. SPIE 7667, Biometric Technology for Human Identification VII.*

(Continued)

*Primary Examiner* — Jason Heidemann
(74) *Attorney, Agent, or Firm* — Fish & Richardson P.C.

(57) ABSTRACT

The present invention discloses a system and method for synthesizing a portrait sketch from a photo. The method includes: dividing the photo into a set of photo patches; determining first matching information between each of the photo patches and training photo patches pre-divided from a set of training photos; determining second matching information between each of the photo patches and training sketch patches pre-divided from a set of training sketches; determining a shape prior for the portrait sketch to be synthesized; determining a set of matched training sketch patches for each of the photo patches based on the first and the second matching information and the shape prior; and synthesizing the portrait sketch from the determined matched training sketch patches.

11 Claims, 2 Drawing Sheets

(56) References Cited

OTHER PUBLICATIONS

Tang et al., "Face Sketch Recognition", Jan. 2004, IEEE Trans. Circuits and Systems for Video Technology, vol. 14, No. 1, pp. 50-57.*

Tang et al., "Face Sketch Synthesis and Recognition," 2003, Proc. IEEE Int'l Conf. Computer Vision.*

Liu et al., "A Nonlinear Approach for Face Sketch Synthesis and recognition," 2005, Proc. IEEE Int'l Conf. Computer Vision and Pattern Recognition.*

* cited by examiner

SYSTEM AND METHOD FOR SYNTHESIZING PORTRAIT SKETCH FROM A PHOTO

TECHNICAL FIELD

The present application relates to a system and a method for synthesizing a portrait sketch from a photo.

BACKGROUND OF THE APPLICATION

Recently, automatic face sketch synthesis gets more and more attention due to its applications in law enforcement and digital entertainment. For example, in law enforcement, it is useful to develop a system for searching photos from police mug-shot databases by using a sketch drawing where a photo of a suspect is not available. By transferring face photos to sketches, a sketch drawn by a painter may be directly matched with a sketch automatically synthesized by a computer, so that the authenticity of face recognition may be improved. In the movie industry, artists may save a great amount of time on drawing cartoon faces with an assistance of an automatic sketch synthesis system. Such a system may also make people to easily personalize their identities in the digital world, such as a MSN avatar.

Popular sketch synthesis methods are mostly based on a sample library, which generates a sketch with rich textures from an input face photo based on a set of training face photo-sketch pairs. These approaches can synthesize sketches of different styles by choosing different style of training sets. In the prior art, it is proposed to apply a global feature transform to synthesize a sketch from a photo. However, such a global linear model will not work well if the hair region is included, since the hair styles vary significantly from different people. To overcome this limitation, a patch-based reconstruction is proposed. The drawback of this approach is that the patches in each area are synthesized independently such that their spatial relationships are ignored. Therefore, some face structures cannot be well synthesized. In addition, face sketch synthesis through linear combinations of training sketch patches causes the blurring effect.

In a word, previous methods only work under well controlled conditions and often fail when there are variations of lighting and pose.

SUMMARY OF THE APPLICATION

One aspect of the present application discloses a method for synthesizing a portrait sketch from a photo, comprising:
dividing the photo into a set of photo patches;
determining first matching information between each of the photo patches and training photo patches pre-divided from a set of training photos;
determining second matching information between each of the photo patches and training sketch patches pre-divided from a set of training sketches;
determining a shape prior for the portrait sketch to be synthesized;
determining a set of matched training sketch patches for each of the photo patches based on the first and the second matching information and the shape prior; and
synthesizing the portrait sketch from the determined matched training sketch patches.

In some embodiments, the step of determining a set of matched training sketch patches may comprise:
forming a MRF network model from the first and the second matching information and the shape prior; and
optimizing the MRF network model to determine the plurality of matched training sketch patches for each of the photo patches.

The present application further discloses a method for synthesizing a portrait sketch from a photo, comprising:
dividing the photo into a set of photo patches, each two of the photo patches having an equal spacing;
determining first matching information between each of the photo patches and training photo patches pre-divided from a set of training photos;
determining second matching information between each of the photo patches and training sketch patches pre-divided from a set of training sketches;
determining a shape prior for the portrait sketch to be synthesized;
determining greyscale compatibility information for each two neighboring training sketch patches and gradient compatibility information between two neighboring training sketch patches;
determining a set of matched training sketch patches for each of the photo patches from the first and the second matching information, the shape prior, the greyscale compatibility information and the gradient compatibility information; and
synthesizing the portrait sketch from the matched training sketch patches.

In some embodiments, the step of determining the plurality of matched training sketch patches may comprise:
forming a MRF network model from the first matching information, the second matching information, the shape prior, the greyscale compatibility information and the gradient compatibility information; and
optimizing the MRF network model to determine the matched training sketch patches for each of the photo patches.

Another aspect of the present application discloses a method for synthesizing a portrait sketch from a photo, comprising:
dividing the photo into a set of photo patches;
forming, from a set of training photos and a set of training sketches, a MRF network model for each of the photo patch, wherein the MRF network model includes:
  a shape prior of the portrait sketch,
  first matching information between each of the photo patches and training photo patches pre-divided from a set of training photos;
  second matching information between each of the photo patches and training sketch patches pre-divided from a set of training sketches;
optimizing the MRF network model to select, from the plurality of training sketches, a set of optimally matched training sketch patches for each of the photo patches; and
synthesizing the portrait sketch from the selected training sketch patches.

The present application discloses a system for synthesizing a portrait sketch from a photo, comprising:
a cutting module configured to divide the photo into a set of photo patches;
a photo-photo matching module configured to determine first matching information between each of the photo patches and training photo patches pre-divided from a set of training photos;

a photo-sketch matching module configured to determine second matching information between each of the photo patches and training sketch patches pre-divided from a set of training sketches;

a shape prior determining module configured to determine a shape prior for the portrait sketch;

an optimizing module configured to determine a set of matched training sketch patches for each of the photos based on the first and the second matching information and the shape prior; and a synthesizing module configured to synthesize the portrait sketch from the matched training sketch patches.

In some embodiments, the optimizing module is configured to form a MRF network model based on the first matching information, the second matching information and the shape prior, and wherein the optimizing module is further configured to optimize the MRF network model so as to determine a set of optimally matched training sketch patches for each of the photo patches.

In addition, the above system further comprises a smoothing module configured to determine greyscale compatibility information between two neighboring training sketch patches and gradient compatibility information between two neighboring training sketch patches. In this circumstance, the optimizing module is configured to form a MRF network model based on the first matching information, the second matching information, the shape prior information, the greyscale compatibility information and the gradient compatibility information, and the optimizing module is further configured to optimize the MRF network model so as to determine the matched training sketch patch for each of the photo patches.

The method and the system as disclosed herein are able to process face photos that are formed from different lighting conditions and in different poses. With at least one of the following technical features, the method and the system may achieve the robustness to variations of lighting and pose.

1. Shape prior information for the specific facial components are introduced to reduce artifacts and distortions caused by variations of lighting and pose.

2. New patch descriptors and metrics are used to find the sketch patches corresponding to the given photo patches.

3. The compatibility limitations are adopted to the greyscale and gradient of the neighboring sketch patches.

DETAILED DESCRIPTION

Hereinafter, the embodiments of the present application will be described in detail with reference to the detailed description as well as the drawings.

Embodiment 1

Figure 1:
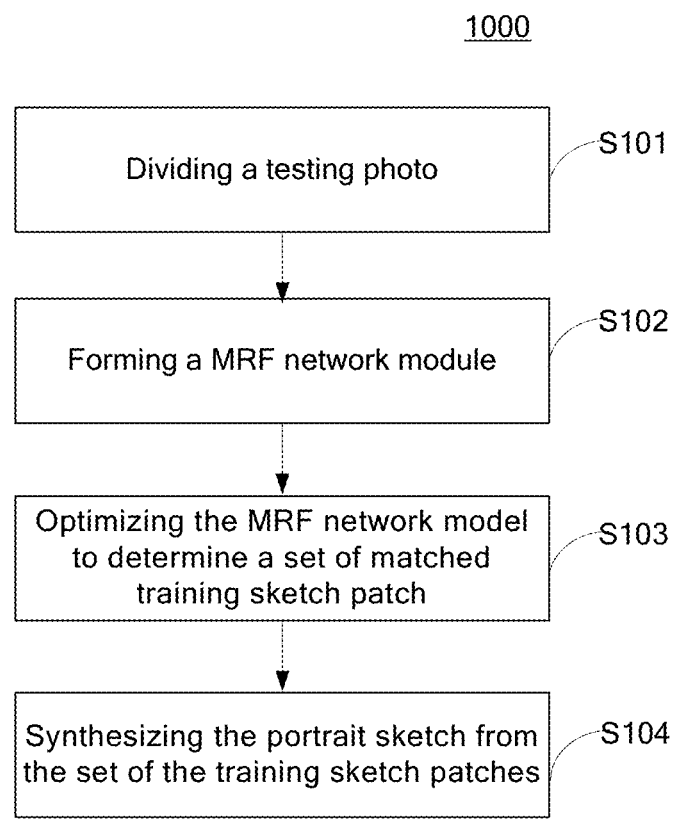
FIG. 1 shows a method for synthesizing a portrait sketch from a photo according to one embodiment of the present application.

FIG. 1 shows a method 1000 for synthesizing a portrait sketch from a photo according to one embodiment of the present application. The method starts with the step S101. In step S101, a photo may be divided into N photo patches. In one embodiment, the photo may be divided into N overlapping photo patches with equal spacings. In addition, all the photos and sketches to be described below may be preprocessed such as translated, rotated, and scaled, such that make centers of the two eyes are to fixed positions. In one embodiment, the images may be cropped to a size of 250×200 and positions of the centers of the two eyes may be (75, 125) and (125, 125). All color images are converted to grayscale images.

Empirically, when the photos are obtained with the near frontal lighting, the method as described works well without the preprocessing. However, for side light, the Contrast Limited Adaptive Histogram Equalization (CLAHE) can be used for preprocessing.

In step S102, based on the N patches obtained in step S101, a Markov Random Field (MRF) network model can be formed for each photo patch based on a set of training photos and a set of training sketches.

Each photo patch $x_i^p$ is a node on the MRF network model. The goal of estimation through the MRF network model is to estimate the status of the node, i.e. $y_i=(y_i^p, y_i^s)$. That is, a pair of photo patch and sketch patch are found in the training set for each $x_i^p$, wherein the photos and sketches in the training set are geometrically aligned. $y_i^p$ is a photo patch and $y_i^s$ is its corresponding sketch patch. If patches i and j are neighbors on the photo, nodes $y_i$ and $y_j$ are connected by an edge, which enforces a compatibility constraint. The sketch of the photo is synthesized by stitching the estimated sketch patches $\{y_i^s\}$.

Figure 2:
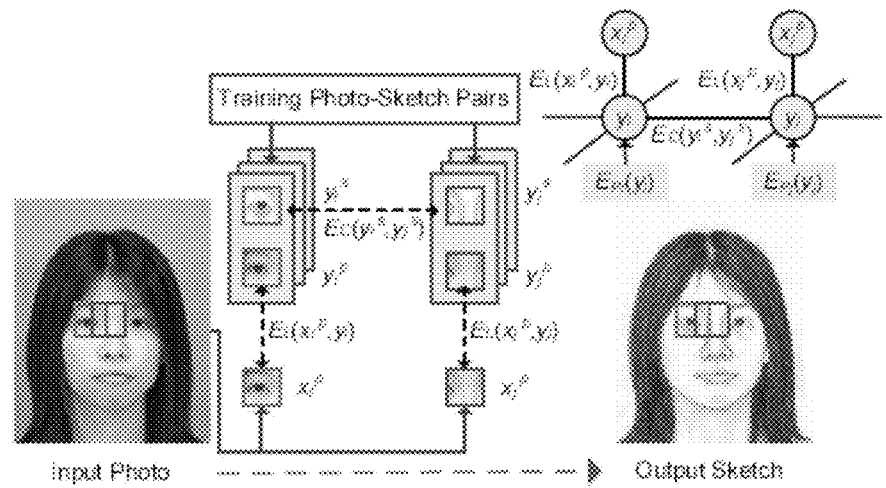
FIG. 2 shows a schematic diagram of a Markov Random Field (MRF) network model.

FIG. 2 shows a schematic diagram of the above MRF network model. The energy function of the MRF network model is defined in the following formula:

$$E(\{y_i\}_{i=1}^N) = \sum_{i=1}^N E_L(x_i^p, y_i) + \sum_{i=1}^N E_{Pi}(y_i) + \sum_{(i,j)\in E} E_C(y_i^s, y_j^s), \quad (1)$$

where $\Xi$ is the set of pairs of neighboring patches, $E_L(x_i^p, y_i)$ is a local evidence function, $E_{Pi}(y_i)$ is a shape prior function, and $E_C(y_i^s, y_j^s)$ is a neighboring compatibility function, which will be described below.

In the present application, two-scale MRF may be used. In the circumstances, patch sizes at two layers of the testing photo and training photo may be, for example, 10×10 and 20×20, respectively. For ease of understanding, the single-scale MRF model is used in the presentation hereinafter.

In step S103, the MRF model is optimized to select optimally matched training sketch patches from a set of training sketch patches for each testing photo. In one embodiment, a belief propagation algorithm may be used to optimize the above MRF model, that is, the optimally matched sketch patch $y_i^s$ of the photo patch $x_i^p$ of the input photo may be obtained by obtaining a minimum value of $E(\{y_i\}_{i=1}^N)$ in the formula (1). In addition, MAP estimation may be used in the belief propagation algorithm, which is conventional technology and thus omit its detailed description.

In order to save computational cost, a step of candidate selection is used before optimizing the MRF model. For each divided photo patch $x_i^p$, top K (K=20) photo-sketch pairs with the smallest energy of $E_L(x_i^p, y_i)+E_{Pi}(y_i)$ are selected from the training set as candidates. In order to take the advantage of face structures, candidates are searched within a 25×25 local region around patch i instead of in the entire images. The final estimation $y_i$ on node i is selected as one of the K candidates through joint optimization of all the nodes on the MRF network.

Finally, in step S104, the selected training sketch patches are synthesized as a face sketch. In one embodiment, to avoid blurring effect, a minimum error boundary cut algorithm may be applied to the overlapped pixels of two overlapping photo patches, which is usually done for texture synthesis.

Embodiment 2

The embodiment 2 according to the present application is similar to the above embodiment 1. However, the difference between them is the MRF model built in the step S102 as the follows:

$$E(\{y_i\}_{i=1}^N) = \sum_{i=1}^N E_L(x_i^p, y_i) + \sum_{i=1}^N E_{P_i}(y_i) \qquad (1')$$

The other steps are the same as those in embodiment 1, the detailed description of which is omitted accordingly herein.

Hereinafter, the local evidence function, shape prior function and neighboring compatibility function in the above formulas (1) or (1') will be described, respectively.

1. Local Evidence Function

The goal of the local evidence function is to find a sketch patch $y_i^s$ matched with the photo patch $x_i^p$ in test. However, since photos and sketches are different modalities, it is unreliable to directly match them. So the training photo patch $y_i^p$ corresponding to a training sketch patch is involved. It is assumed that if $y_i^p$ is similar to $x_i^p$, it is likely for $y_i^s$ to be a good estimation of the sketch patch to be synthesized. In the application, a method for matching the divided photo patch with the training photo patch and also with the training sketch patch simultaneously is proposed. That is, the local evidence function is defined as the weighted sum of squared difference distance $d_{L1}^2$ of photo to photo and squared difference distance $d_{L2}^2$ of photo to sketch, $$E_L(x_i^p, y_i) = d_{L1}^2(x_i^p, y_i^p) + \lambda_{L2} d_{L2}^2(x_i^p, y_i^s), \qquad (2)$$

where, $E_L(x_i^p, y_i)$ is the energy function of shape prior information;

$d_{L1}^2(x_i^p, y_i^p)$ is the squared inter-modality distance between the divided photo patch $x_i^p$ and the training photo patch $y_i^p$;

$d_{L2}^2(x_i^p, y_i^s)$ is the squared inter-modality distance between the divided photo patch and the training sketch patch $y_i^s$; and $\lambda_{L2}$ is the weight to balance different terms in the energy function and it is chosen as 2 in one embodiment.

It can be seen from the formula (2) that the above local evidence function includes the following two aspects.

1.1 Photo-to-Photo Patch Matching $d_{L1}^2(x_i^p, y_i^p)$

A straightforward choice of $E_L(\ )$ may be, for example, the Euclidean distance between $x_i^p$ and $y_i^p$ as used in the prior art. However, it does not perform well when the lighting condition varies. Noticing that most of the sketch contours correspond to edges in the photo, a difference-of-Gaussians (DoG) filter is used to process each photo, i.e. to convolve each photo with the difference of two Gaussian kernels with standard deviations $\sigma_0$ and $\sigma_1$, and then normalize all pixel values to zero-mean and unit-variance. In one embodiment, $(\sigma_0, \sigma_1)=(0, 4)$ or $(1, 4)$ is used preferably. DoG filtering has two advantages. Firstly, it can detect and enhance the edges, and thus the synthesized sketch has better facial details. Secondly, subtracting low-frequency component can reduce the effect of lighting variations, e.g. shading effects. To normalize the distribution of pixel values in an image to zero-mean and unit-variance is commonly used for lighting normalization. However, it has a limited effect to improve the synthesis of the portrait sketch.

1.2 Photo-to-Sketch Patch Matching $d_{L2}^2(x_i^p, y_i^s)$

The intra-modality distance between the photo patches does not always work for selecting a good sketch patch. Similar photo patches under the Euclidean distance may correspond to very different sketch patches. Interestingly, people have the ability to directly match photos with sketches. Inspired by this, it is proposed to use inter-modality distance between the divided (testing) photo patches and the training sketch patches to enhance the selection ability. As the visual appearances of photo and the sketch patches are different, it is difficult to directly match them. However, there exists some similarity of gradient orientations between a photo and its sketch. And thus, the intra-modality distance between the photo patch and the sketch patch can be obtained through the steps as discussed below.

Firstly, the dense SIFT descriptor from the family of histogram-of-orientations descriptors is determined for each testing photo patch. Please see Lowe, D.: *Distinctive image features from scale-invariant keypoints. IJCV* 60, 91-110 (2004) for details. In one embodiment, a dense SIFT descriptor is assigned to each patch, and then Euclidean distance between the determined SIFT descriptors is obtained and is used as the inter-modality distance between the each photo patch and the corresponding training sketch patch. To capture structures in large scales, the descriptors are extracted in larger regions than patches. For each patch, we extract a region of size 36×36, which center is overlapped at the center of the patch (the size of patch is 10×10), and divide it into 4×4 spatial bins of the same size. 8 orientations bins are evenly spaced over 0°-360°. The contribution of a pixel to the histogram is weighted by its gradient magnitude and a Gaussian window with the parameter σ=6 centered at the center of the patch. So the descriptor is 128 dimensional. In one embodiment, the descriptor is normalized by its L2−norm, clipped by a threshold 0.2 and renormalized. Please see Lowe, D.: *Distinctive image features from scale-invariant keypoints. IJCV* 60, 91-110 (2004) for details.

2. Shape Prior Function

Face images are a special class of images with well regularized structures. Thus shape priors on different face components can be used to effectively improve the synthesis performance. The loss of some face structures, especially the face profile, is a common problem for the patch-based sketch synthesis methods without referring to global structures. When this happens, the contours of some face components are replaced by blank regions. This problem becomes much more serious when there are variations of lighting and pose. However, it can be effectively alleviated by using the shape prior on different face components to guide the selection of sketch patches. Firstly, some predefined landmarks on both the training sketches and the testing photo are detected. In one embodiment, a state-of-the-art face alignment algorithm, such as algorithm proposed in Liang, L., Xiao, R., Wen, F., Sun, J.: *Face alignment via component-based discriminative search*. In: Forsyth, D., Torr, P., Zisserman, A. (eds.) ECCV 2008, *Part II. LNCS*, vol. 5303, pp. 72-85. Springer, Heidelberg (2008), may be utilized to detect landmarks. The chosen landmarks are located in regions where loss of structures often happens, especially on the face profile. Shape priors are imposed to these regions but not in other regions. If a landmark f falls into a patch i on the testing photo, a prior distribution is computed via a kernel density estimation, $$E_{Pi}(y_i) = \lambda_P \ln\left[\frac{1}{\sqrt{2\pi} N_i} \sum_{k=1}^{N_i} \exp\left(-\frac{(\beta(y_i^s) - \beta_{k,f})^2}{h_f^2}\right)\right]. \quad (3)$$

where, $N_t$ is the number of training sketches.

$\beta(y_i^s)$ is some statistic on the sketch patch $y_i^s$.

$\beta_{k,f}$ is the statistic on a sketch patch centered at landmark f in sketch image k.

$h_f$ is the bandwidth of the landmark f and is set as three times of the standard deviation of $\{\beta_{k,f}\}$.

$\lambda_p$ is the weight to normalize the metric scale of the shape prior term. The result obtained from the algorithm according to the present application is robust to $\lambda_p$ in a fairly large range. In one embodiment, the weight $\lambda_p$=0.01.

The above patch statistics may be, for example, mean gradient magnitude, variance of pixel values, and proportion of edge pixels. Preferably, the mean gradient magnitude is chosen as $\beta(\bullet)$. It can well solve the problem of losing structures in synthesized sketch.

3. Neighboring Compatibility Function

The goal of the neighboring compatibility function is to make the neighboring estimated sketch patches smooth and thus to reduce the artifacts on the synthesized sketch. In one embodiment, for example the neighboring compatibility function is defined as:

$$E_C(y_i, y_j) = \lambda_{IC} d_{IC}^2(y_i^s, y_j^s) + \lambda_{GC} d_{GC}^2(y_i^s, y_j^s), \quad (4)$$

where the grayscale compatibility term $d_{IC}^2$ is the square of the difference in the overlapping region between two neighboring sketch patches $y_i^s$ and $y_j^s$, and the gradient compatibility term $d_{GC}^2$ is the square of the Euclidean distance between the dense SIFT descriptors of $y_i^s$ and $y_j^s$. The grayscale compatibility term is for the smoothness of the output sketch. However, only using this term tends to lose some face structures since two blank regions in neighbors have high grayscale compatibility. Thus, we further add the gradient compatibility constraint to the formula (4), which requires that the neighboring patches have similar gradient orientations. The use of gradient compatibility can further alleviate the structural loss. For example, the weights $\lambda_{IC}$=1 and $\lambda_{GC}$=0.1.

Figure 3:
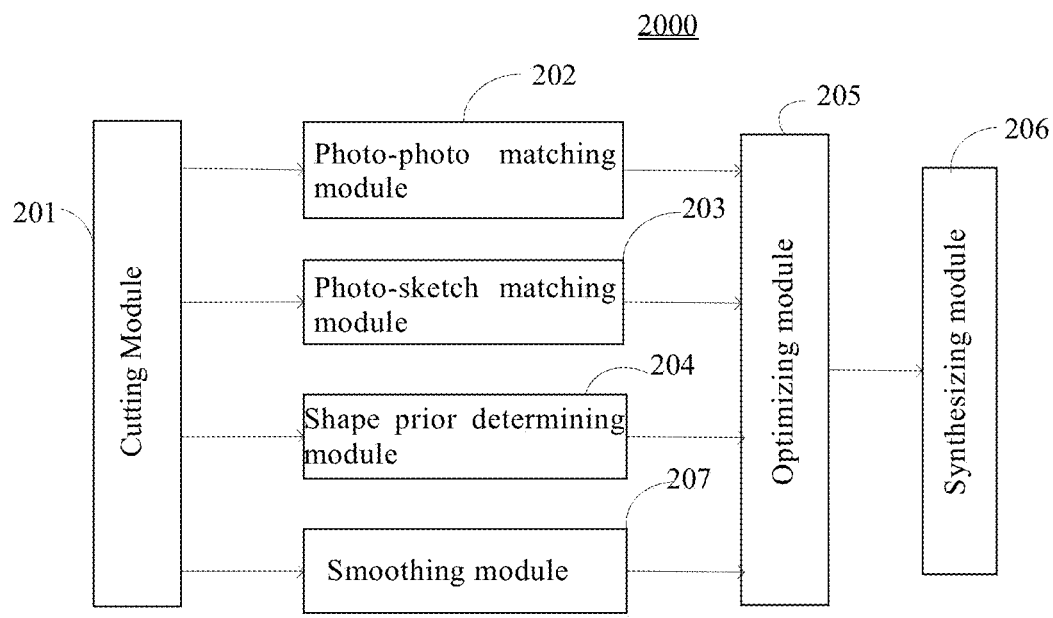
FIG. 3 shows a system for synthesizing a portrait sketch from a photo according to one embodiment of the present application.

The above description describes the method for synthesizing a portrait sketch from a photo according to one aspect of the present application. Hereinafter, the system 2000 for synthesizing portrait sketch from a photo according to another aspect of the present application will be described. As shown in FIG. 3, the system 2000 includes a cutting module 201, a photo-photo matching module 202, a photo-sketch matching module 203, a shape prior determining module 204, an optimizing module 205 and a synthesizing module 206.

The cutting module 201 is configured to divide a photo into a set of photo patches. As described above, the photo may be divided into N overlapped patches with equal spacings. In addition, all the photos and sketches to be described below are preprocessed, for example, by translating, rotating, and scaling, such that the two eye centers of all the face images are at fixed position.

The photo-photo matching module 202 is configured to determine first matching information between each photo patch and training photo patches pre-divided from a set of training photos. The first matching information may include the squared inter-modality distance between each divided photo patch and the corresponding training photo patch. The photo-sketch matching module 203 is configured to determine second matching information between each photo patch and training sketch patches pre-divided from a set of training sketches. The second matching information may include the squared difference distance between each photo patch and the corresponding training sketch patch. The dense SIFT descriptor can be determined for each divided photo patch, and then Euclidean distance between the determined SIFT descriptors is obtained and is used as a distance between the photo patch and the corresponding training sketch patch.

The shape prior determining module 204 is configured to determine the shape prior of each divided photo patch. In one embodiment, the shape prior determining module 204 is configured to determine the shape prior by using the above formula (3), according to predefined landmarks on both the training sketches and the photo.

The optimizing module 205 is configured to determine a set of matched training sketch patches for each of the photos based on the first and the second matching information and the shape prior. In practically, the optimizing module 205 may be used to build MRF network model based on the first matching information, the second matching information and the shape prior information, and to determine the optimally matched training sketch patch for each of the photo patches through optimizing the MRF network model. The MRF network model may be, for example, as shown by the above formula (1').

The synthesizing module 206 is configured to synthesize a face sketch from the optimally matched training sketch patches determined by the optimizing module 205.

In addition, according to another embodiment of the present application, the system 2000 may further includes a smoothing module 207 configured to determine the grayscale compatibility information between the two neighboring training sketch patches and the gradient compatibility information between the two neighboring training sketch patches, where, the grayscale compatibility information is the square of the difference in the overlapping region between two neighboring training sketch patches; and the gradient compatibility information is the square of the Euclidean distance between the dense SIFT descriptors of two neighboring training sketch patches. The squared inter-modality distance can be obtained by determining the dense SIFT descriptor for each divided photo patch, and obtaining the Euclidean distance between the determined SIFT descriptors so as to use the Euclidean distance as the inter-modality distance between each of the photo patches and the corresponding training sketch patch. In the circumstances, the optimizing module 205 may build the MRF network model based on the first matching information, the second matching information, the shape prior information, the greyscale compatibility information and the gradient compatibility information, and may determine the optimally matched training sketch patches for each divided photo through optimizing the MRF network model.

Embodiments and implementations of the present application have been illustrated and described, and it should be understood that various other changes may be made therein without departing form the scope of the application.

What is claimed is:

1. A computer-implemented method for synthesizing a portrait sketch from a photo, comprising:
   dividing the photo into a set of photo patches;
   forming, from a set of training photos and a set of training sketches, a MRF network model for each of the photo patch, wherein the MRF network model includes:
   a shape prior of the portrait sketch,
   first matching information between each of the photo patches and a set of training photo patches pre-divided from a set of training photos;
   second matching information between each of the photo patches and a set of training sketch patches pre-divided from a set of training sketches;
   optimizing the MRF network model to select, from the set of training sketches, a set of ly matched training sketch patches for each of the photo patches; and
   synthesizing the portrait sketch from the selected training sketch patches,
   wherein the shape prior is determined through the following steps:
   detecting the predefined landmarks on the training sketches and the photo;
   determining the shape prior via a kernel density estimation if a landmark f falls into a patch i on the photo:

$$E_{Pi}(y_i) = \lambda_P \ln\left[\frac{1}{\sqrt{2\pi} N_i} \sum_{k=1}^{N_i} \exp\left(-\frac{(\beta(y_i^s) - \beta_{k,f})^2}{h_f^2}\right)\right]$$

where $N_t$ is the number of training sketches,
   $\beta(y_i^s)$ is a statistic on the sketch patch $y_i^s$;
   $\beta_{k,f}$ is a statistic on a sketch patch centered at the landmark f in a sketch image k;
   $h_f$ is a bandwidth of the landmark f; and
   $\lambda_P$ is a metric scale to normalize the prior shape.

2. A method according to claim 1, wherein there are overlapped regions among neighboring photo patches of the divided photo patches; and
   wherein the MRF network further includes:
   greyscale compatibility information between two neighboring training sketch patches and gradient compatibility information between two neighboring training sketch patches.

3. A method according to claim 2, wherein the greyscale compatibility information is a square of the difference in an overlapping region between two neighboring training sketch patches; and
   the gradient compatibility information is a square of Euclidean distance between dense SIFT descriptors of two neighboring training sketch patches.

4. A method according to any one of claim 1, wherein the first matching information includes a squared difference distance between each of the photo patches and the corresponding training photo patch, and
   the second matching information includes a squared difference distance between each of the photo patches and the corresponding training sketch patch.

5. A computer-implemented method for synthesizing a portrait sketch from a photo, comprising:
   dividing the photo into a set of photo patches;
   forming a MRF network model for each of the photo patches from a set of training photos and a set of training sketches;
   optimizing the MRF network model using a belief propagation algorithm so as to select, from the set of training sketches, a set of ly matched training sketch patches for each of the photo patches; and
   synthesizing the portrait sketch from the selected training sketch patches;
   wherein the MRF is defined by the following formula:

$$E(\{y_i\}_{i=1}^N) = \sum_{i=1}^N E_L(x_i^p, y_i) + \sum_{i=1}^N E_{Pi}(y_i) + \sum_{(i,j)\in E} E_C(y_i^s, y_j^s), \quad (1)$$

Wherein $$E_L(x_i^p, y_i) = d_{L1}^2(x_i^p, y_i^p) + \lambda_{L2} d_{L2}^2(x_i^p, y_i^s), \quad (2)$$

$$E_{Pi}(y_i) = \lambda_P \ln\left[\frac{1}{\sqrt{2\pi} N_i} \sum_{k=1}^{N_i} \exp\left(-\frac{(\beta(y_i^s) - \beta_{k,f})^2}{h_f^2}\right)\right]$$

$$E_C(y_i, y_j) = \lambda_{IC} d_{IC}^2(y_i^s, y_j^s) + \lambda_{GC} d_{GC}^2(y_i^s, y_j^s), \quad (4)$$

wherein $\lambda_{L2}$, $\lambda_{IC}$ and $\lambda_{GC}$ are weights with a numeric range of 0~1;
$x_i^p$ is the photo patches;
$y_i^p$ is the training photo patches;
$y_i^s$ is the training sketch patches;
$y_i$ is a photo-sketch pair formed by the $y_i^p$ and the $y_i^s$;
N is the number of photo patches;
$N_t$ is the number of photo-sketch pairs;
$\beta(y_i^s)$ is the statistic on the sketch patch $y_i^s$;
$\beta_{k,f}$ is the statistic on a sketch patch centered at a landmark f in a sketch image k;
$h_f$ is a bandwidth of the landmark f,
$\lambda_P$ is a metric scale to normalize the prior shape;
$d_{IC}^2$ is a square of the difference in an overlapping region between two neighboring sketch patches $y_i^s$ and $y_j^s$;
the gradient compatibility term $d_{GC}^2$ is a square of Euclidean distance between the dense SIFT descriptors of $y_i^s$ and $y_j^s$.

6. A system for synthesizing a portrait sketch from a photo, comprising:
   a memory that stores executable modules; and
   a processor configured to execute the executable modules to perform operations of the system, wherein, the executable modules comprise:
   a cutting module configured to divide the photo into a set of photo patches;
   a photo-photo matching module configured to determine first matching information between each of the photo patches and training photo patches pre-divided from a set of training photos;
   a photo-sketch matching module configured to determine second matching information between each of the photo patches and training sketch patches pre-divided from a set of training sketches;
   a shape prior determining module configured to determine a shape prior for the portrait sketch;
   an optimizing module configured to determine a set of matched training sketch patches for each of the photos based on the first and the second matching information and the prior shape; and
   a synthesizing module configured to synthesize the portrait sketch from the matched training sketch patches,
   wherein the prior shape is determined through the following steps:

detecting the predefined landmarks on the training sketches and the photo;

determining the shape prior via a kernel density estimation if a landmark f falls into a patch i on the photo:

$$E_{Pi}(y_i) = \lambda_P \ln\left[\frac{1}{\sqrt{2\pi} N_i} \sum_{k=1}^{N_i} \exp\left(-\frac{(\beta(y_i^s) - \beta_{k,f})^2}{h_f^2}\right)\right]$$

where $N_t$ is the number of training sketches;

$\beta(y_i^s)$ is a statistic on the sketch patch $y_i^s$;

$\beta_{k,f}$ is a statistic on a sketch patch centered at the landmark f in a sketch image k;

$h_f$ is a bandwidth of the landmark f; and $\lambda_P$ is a metric scale to normalize the prior shape.

7. A system according to claim 6, wherein the first matching information includes a squared difference distance between each photo patch and the corresponding training photo patch, and the second matching information includes a squared difference distance between each photo patch and the corresponding training sketch patch.

8. A system according to claim 6, wherein the optimizing module is configured to form a MRF network model based on the first matching information, the second matching information and the shape prior, and wherein the optimizing module is further configured to optimize the MRF network model so as to determine a set of optimally matched training sketch patches for each of the photo patches.

9. A system according to claim 6, wherein the executable modules further comprise:

a smoothing module configured to determine greyscale compatibility information between two neighboring training sketch patches and gradient compatibility information between two neighboring training sketch patches.

10. A system according to claim 9, wherein the optimizing module is configured to form a MRF network model based on the first matching information, the second matching information, the shape prior information, the greyscale compatibility information and the gradient compatibility information, and the optimizing module is further configured to optimize the MRF network model so as to determine the matched training sketch patch for each of the photo patches.

11. A system according to claim 6, wherein each of the predefined landmarks is located in profile of the training sketches and the photo.

* * * * *